(12) United States Patent
Kitazumi

(10) Patent No.: US 7,222,790 B2
(45) Date of Patent: May 29, 2007

(54) APPARATUS FOR OPTICALLY READING INFORMATION

(75) Inventor: Yoshimi Kitazumi, Chiryu (JP)

(73) Assignee: Denso Wave Incorporated, Tokyo (JP)

( * ) Notice: Subject to any disclaimer, the term of this patent is extended or adjusted under 35 U.S.C. 154(b) by 50 days.

(21) Appl. No.: 11/156,455

(22) Filed: Jun. 21, 2005

(65) Prior Publication Data

US 2005/0279834 A1 Dec. 22, 2005

(30) Foreign Application Priority Data

Jun. 21, 2004 (JP) .............................. 2004-182622

(51) Int. Cl.
*G06K 7/10* (2006.01)
*G06K 7/14* (2006.01)

(52) U.S. Cl. ...................... 235/454; 235/435; 235/494; 235/472.01

(58) Field of Classification Search ................ 235/454, 235/462.01, 462.11, 462.24, 462.41, 472.01, 235/439, 435, 494
See application file for complete search history.

(56) References Cited

U.S. PATENT DOCUMENTS

| | | | | |
|---|---|---|---|---|
| 5,834,749 A | * | 11/1998 | Durbin | ........................ 235/454 |
| 6,033,090 A | * | 3/2000 | Seo | ............................. 362/252 |
| 6,206,287 B1 | * | 3/2001 | Wasula et al. | ......... 235/462.05 |
| 6,332,574 B1 | | 12/2001 | Shigekusa et al. | |
| 6,811,085 B2 | * | 11/2004 | Carlson et al. | ............. 235/454 |
| 7,040,538 B2 | * | 5/2006 | Patel et al. | .................. 235/454 |
| 2005/0167498 A1 | * | 8/2005 | Ito et al. | ...................... 235/454 |
| 2006/0192010 A1 | * | 8/2006 | Massieu et al. | ............. 235/454 |

FOREIGN PATENT DOCUMENTS

JP 5-56218 3/1993

* cited by examiner

*Primary Examiner*—Thien M. Le
*Assistant Examiner*—Edwyn Labaze
(74) *Attorney, Agent, or Firm*—Posz Law Group, PLC

(57) ABSTRACT

In an apparatus for optically reading an information code, a case has one wall in which a reading window through which light is transmittable. The reading window has a length and a width. An area sensor has a pixel area composed of pixels. The pixels are arranged in rows and columns. The area sensor is disposed in the case such that the pixel area is opposite to a window surface of the reading window, and row and column directions of the area sensor are inclined to directions along the length and width of the reading window, respectively.

8 Claims, 4 Drawing Sheets

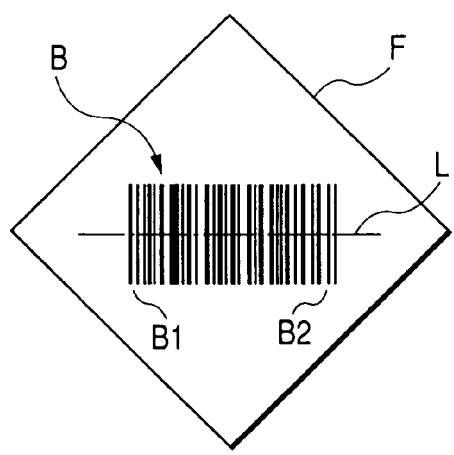
FIG. 4A
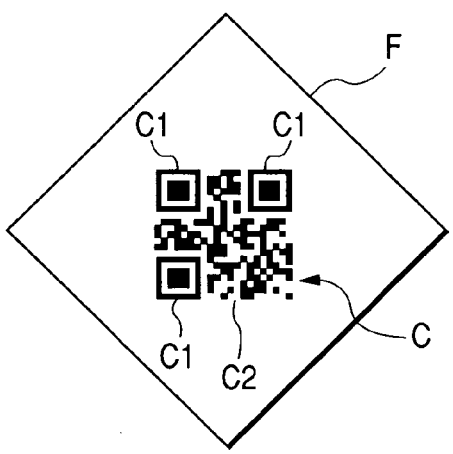
FIG. 4B
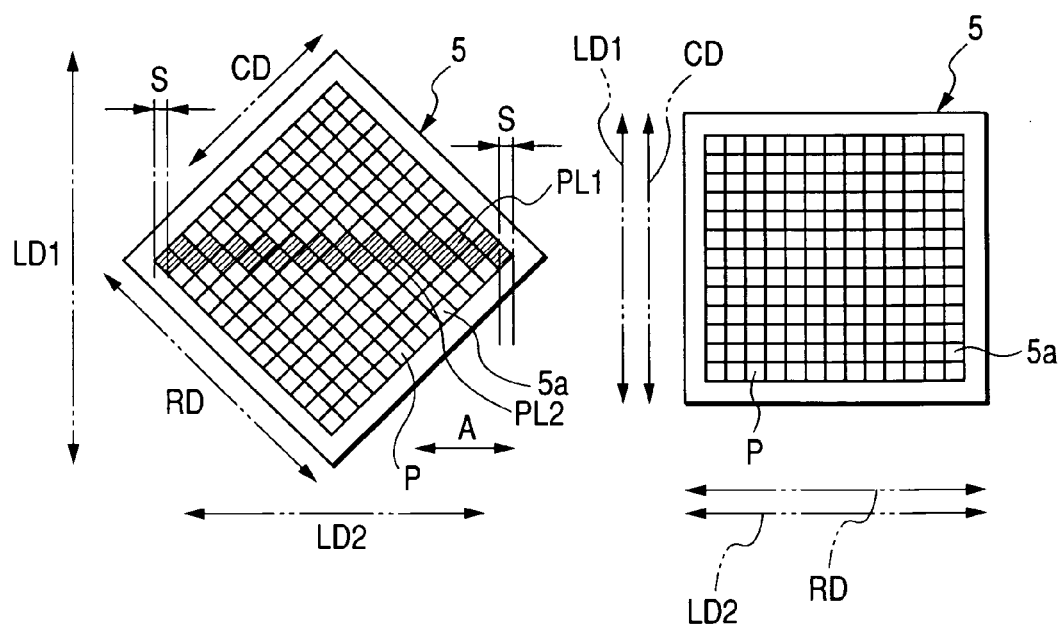
FIG. 5A
FIG. 5B

APPARATUS FOR OPTICALLY READING INFORMATION

BACKGROUND OF THE INVENTION

CROSS REFERENCE TO RELATED APPLICATION

This application is based on Japanese Patent Application 2004-182622 filed on Jun. 21, 2004. This application claims the benefit of priority from the Japanese Patent Application, so that the descriptions of which are all incorporated herein by reference.

1. Field of the Invention

The present invention relates to apparatuses for optically reading information. More particularly, the present invention relates to apparatuses for optically reading a one-dimensional code (barcode) and a two-dimensional code as the information. Each of the apparatuses has a case formed at its one end with a reading window, and has an area sensor with pixels arranged in rows and columns.

2. Description of the Related Art

Systems using optically readable barcodes (one-dimensional codes) have been provided for supporting commodity sales and/or stock control. Optical information readers, such as barcode readers, for reading such barcodes commonly use CCD (Charge-Coupled Device) line sensors, respectively. An example of the barcode readers with a CCD line sensor is disclosed in Japanese Unexamined Patent Publication No. H5-56218.

Because a barcode (one-dimensional code) has a only one-dimensional data storage area, the one-dimensional data storage area limits the amount of data that can be stored on it. In other words, it is necessary to elongate the barcode in the one-dimensional direction in order to increase the amount of data storable on it, making it difficult to downsize the barcode while keeping the amount of data storable on it.

Recently, two-dimensional codes, typified by QR codes, which can store large amount of data while keeping the size thereof compact, have become widespread. Barcodes and two-dimensional codes are therefore commonly used in various situations. Optical information readers, which commonly use a CCD image sensor having a plurality of pixels arranged in rows and columns, have been provided. The optical information readers with the CCD image sensor are capable of reading both the barcodes and the two-dimensional codes.

When reading an one-dimensional code, such as a barcode, using an optical information reader with an area sensor, the resolution of the optical information reader to the one-dimensional code depends on the number of pixels of the area sensor in the horizontal (row) direction. Even if an optical information reader is integrated with an area sensor having approximately 300,000 pixels, the resolution of this type optical information reader to the one-dimensional code may be insufficient as compared with a barcode reader with a line sensor. This may make it difficult for an optical information reader with an area sensor to obtain high reading resolution to an one-dimensional code.

SUMMARY OF THE INVENTION

The present invention is made on the background so that preferable embodiments of optical reading apparatuses of the present invention are capable of reading both a one-dimensional code and a two-dimensional code while keeping the resolution to the one-dimensional code.

According to one aspect of the present invention, there is provided an apparatus for optically reading an information code. The apparatus includes a case having one wall in which a reading window through which light is transmittable. The reading window has a length and a width. The apparatus includes an area sensor with a pixel area composed of pixels. The pixels are arranged in rows and columns. The area sensor is disposed in the case such that the pixel area is opposite to a window surface of the reading window, and row and column directions of the area sensor are inclined to directions along the length and width of the reading window, respectively.

BRIEF DESCRIPTION OF THE DRAWINGS

Other objects and aspects of the invention will become apparent from the following description of embodiments with reference to the accompanying drawings in which:

FIG. 4A is a view illustrating a positional relationship between a barcode and a field of view of an area sensor of the optical information reading apparatus according to the embodiment;

FIG. 4B is a view illustrating a positional relationship between a QR code and the field of view of the area sensor of the optical information reading apparatus according to the embodiment;

FIG. 5A is a view illustrating an arrangement of the area sensor according to the embodiment;

FIG. 5B is a view illustrating a normal arrangement of an area sensor; and

DETAILED DESCRIPTION OF EMBODIMENTS OF THE INVENTION

An embodiment and its modifications of the present invention will be described hereinafter with reference to the accompanying drawings. In the embodiment and its modifications, the invention is applied to a gun-shaped optical information reading apparatus.

Figure 1:
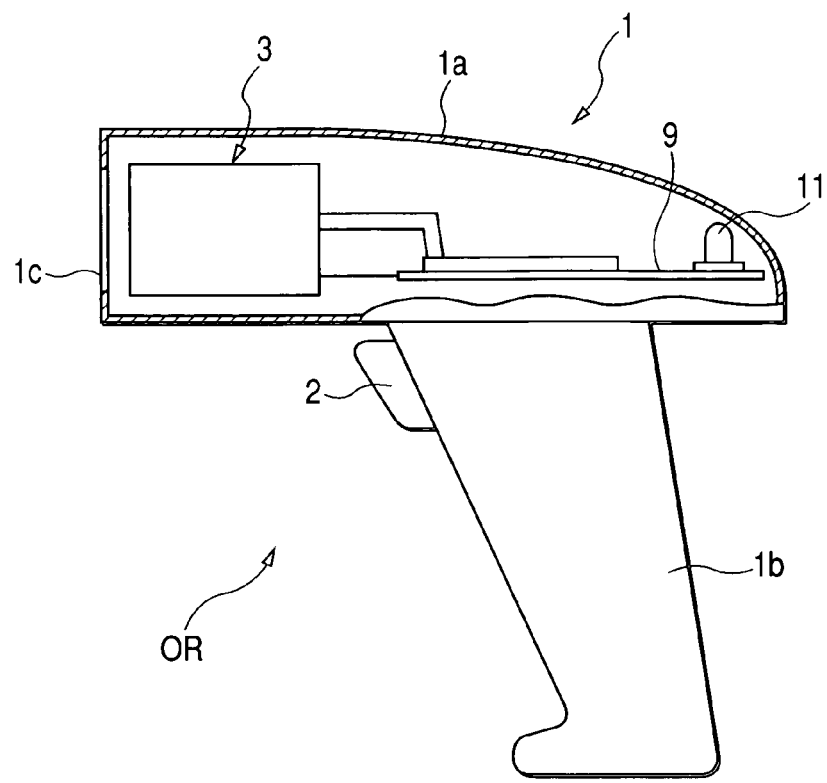
FIG. 1 is a partially cross sectional side view schematically illustrating the structure of a gun-shaped optical information reading apparatus according to an embodiment of the present invention.
Figure 2A:
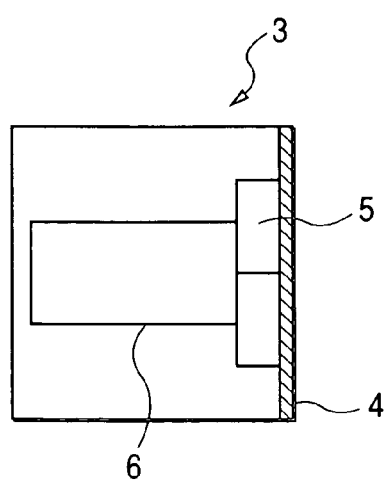
FIG. 2A is a view schematically illustrating one side portion of the reading mechanism shown in FIG. 1 according to the embodiment.
Figure 2B:
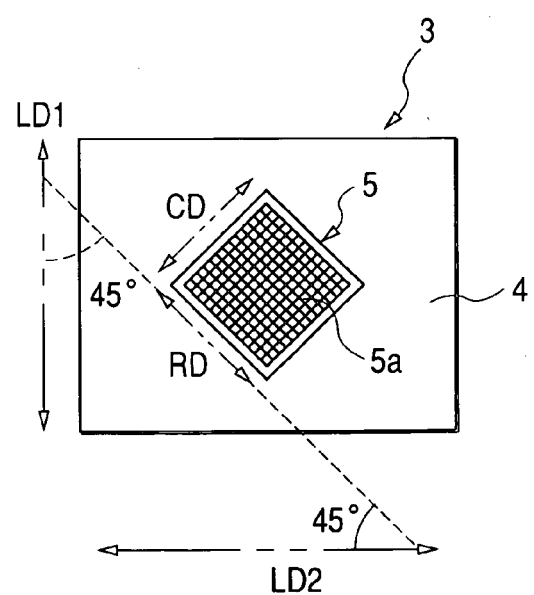
FIG. 2B is a view schematically illustrating the head portion of the reading mechanism shown in FIG. 1 according to the embodiment.
Figure 3:
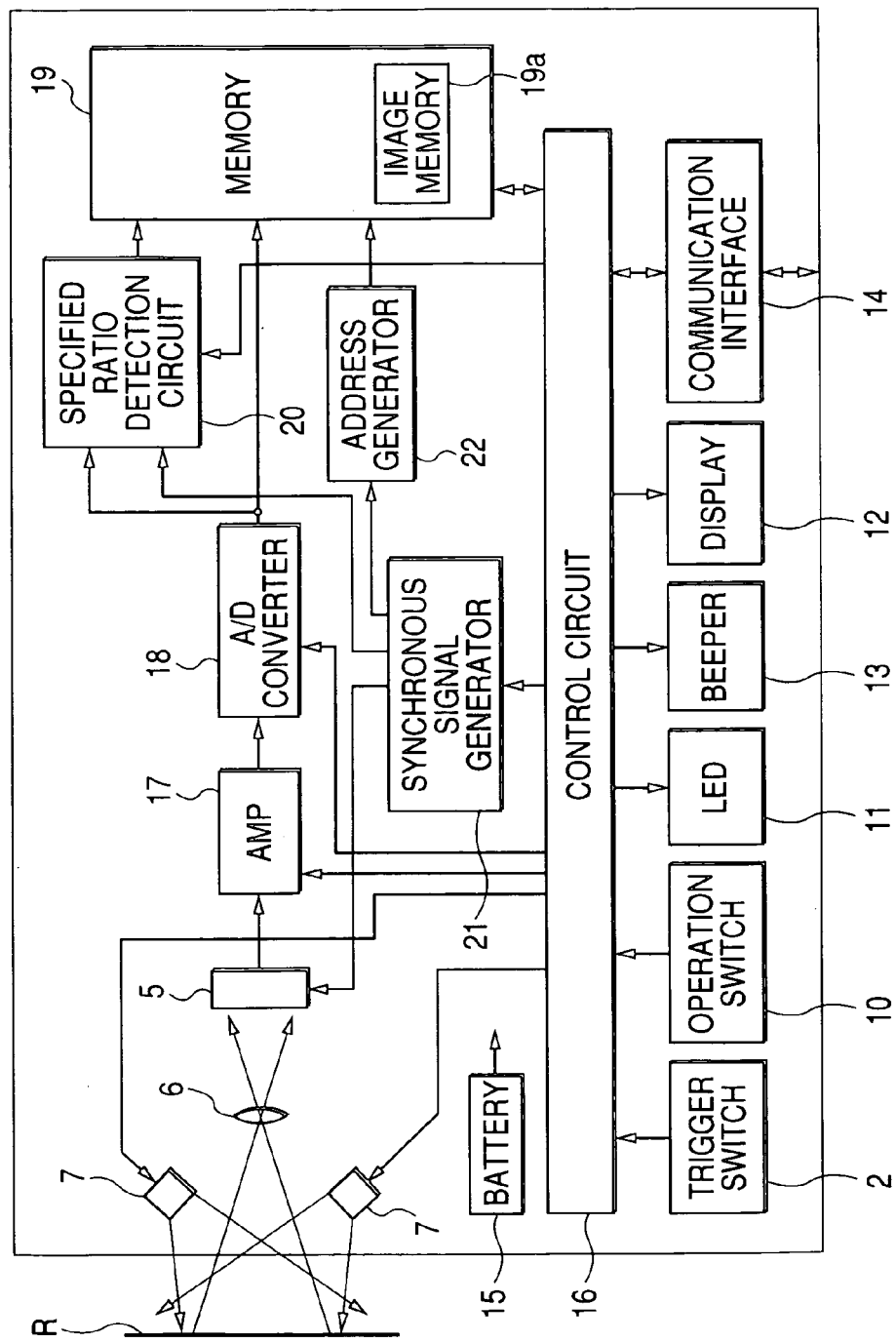
FIG. 3 is a block diagram schematically illustrating an example of the electrical structure of the optical information reading apparatus according to the embodiment.

FIG. 1 is a partially cross sectional side view schematically illustrating the structure of a gun-shaped optical information reading apparatus OR according to an embodiment of the present invention; FIGS. 2A and 2B illustrate the reading mechanism shown in FIG. 1 according to the embodiment; and FIG. 3 is a block diagram schematically illustrating the electrical structure of the optical information reading apparatus OR according to the embodiment.

As shown in FIG. 1, the optical information reading apparatus OR is provided with a gun-shaped case (housing) 1. The gun-shaped case 1 has, for example, a thin rectangular parallelepiped main body 1a. One lateral end portion of the main body 1a is rounded.

The gun-shaped case 1 is provided at one side (specifically, bottom side in FIG. 1) of the one lateral end portion of the main body 1a with a grip portion 1b. The grip portion 1b is integrally formed to the main body 1a. The grip portion 1b allows a user to easily grip the optical information reading apparatus OR in one hand and handle it.

The main body 1a is formed at a lateral surface of the other lateral end portion with a reading window 1c having a length and a width and a translucency. For example, the reading window 1c has a substantially rectangular shape. Specifically, the reading window 1c has a pair of longitudinal sides opposing to each other and a pair of lateral sides opposing to each other.

The optical information reading apparatus OR is also provided with a trigger switch 2. The trigger switch 2 is disposed to one side surface of the grip portion 1b and directed to the reading window 1c. The trigger switch 2 permits a user to instruct a reading operation to the optical information reading apparatus OR.

The optical information reading apparatus OR is provided with a reading mechanism (optical reading mechanism) 3 disposed in the other lateral end portion of the case 1. In the embodiment, the other lateral end portion of the case 1 is referred to as "head portion".

The reading mechanism 3 is operative to read various information codes including two-dimensional codes, typically QR codes, and one-dimensional codes (barcodes), which are written on a target R (see FIG. 3) by printing or other similar methods. The target R includes a label that is a piece of paper or another media and a catalog, which is an illustrated booklet listing available products.

The target R can be attached on goods. The information codes include information, such as, a manufacture's serial number, a name, a unique identification number and a date of manufacture of the goods.

In recent years, the target R includes the screen of a display, such as a liquid crystal display (LCD) in a computer terminal, such as a cellular phone or a PDA (Personal Digital Assistant); the information codes can be displayed on the screen of the display.

As schematically illustrated in FIGS. 1 to 3, the reading mechanism 3 includes a circuit board 4 disposed in the head portion of the case 1 to be opposite to the reading window 1c, and a CCD area sensor 5 mounted on one surface of the board 4, which is opposite to the reading window 1c.

The reading mechanism 3 includes an imaging lens 6 constituting an imaging optics, and a plurality of light illuminating devices 7, (which are only shown in FIG. 3).

The area sensor 5 is configured to, for example, a CCD area sensor having a light sensitive pixel area 5a with a substantially square shape. Specifically, the pixel area 5a is composed of pixels arranged in rows and columns, for example, in matrix (see FIG. 2B).

The area sensor 5 also has a predetermined optical axis. The area sensor 5 is arranged so that its pixel area is parallely opposite to the reading window 1c of the main body 1a and its optical axis passes through the center of the reading window 1c.

The imaging lens 6 is disposed between the reading window 1c and the area sensor 5 in the head portion of the case 1. Specifically, the imaging lens 6 has a body tube and a plurality of lens elements that are disposed coaxially therein. The imaging lens 6 is arranged so that its optical axis extends orthogonally with the head end surface, which is formed with the reading window 1c, of the main body 1a.

That is, the reading window 1c, the area sensor 4 and the imaging lens 6 are coaxially arranged with one another in the main body 1a.

Each of the light illuminating devices 7 is disposed around the imaging lens 6. Specifically, each of the light illuminating devices 7 is provided with, for example, a light emitting device (LED) serving as a light source. Each of the light illuminating devices 7 is also provided with a light lens disposed between each light emitting device and the reading window 1c. An optical axis of each light lens is directed to the reading window 1c so that each light lens is operative to collect and diffuse light emitted from each light emitting device through the reading window 1c.

Specifically, when the reading window 1c of the reading apparatus OR is positioned to be opposite to the target R on which an information code, such as a two-dimensional code or a barcode is written, illuminating light emitted from each of the light illuminating devices 7 is irradiated through the reading window 1c to the information code. Light reflected from the information code is entered through the reading window 1c into the imaging lens 6. The reflected light entered into the imaging lens 6 is focused on the light sensitive pixel area 5a of the area sensor 5 by the imaging lens 6, so that an image corresponding to the target R is picked up by at least part of pixels of the area sensor 5.

In the embodiment, as described above, the information codes that are readable by the optical information reading apparatus OR include the one-dimensional codes and the two-dimensional codes. One typical example of the one-dimensional codes is a barcode, which is illustrated in FIG. 4A as "barcode B". One typical example of the two-dimensional codes is a QR code, which is illustrated in FIG. 4B as "QR code C".

As shown in FIG. 1, the optical information reading apparatus OR is provided with a circuit board 9 disposed in the main body 1a at its one end side, specifically backside opposite to the head side. In the circuit board 9, electrical components of the reading apparatus OR are installed (see FIG. 3). As illustrated in only FIG. 3, the optical information reading apparatus OR is provided with an operation switch 10, an LED (light emitting device) 11, a liquid crystal display 12, a beeper 13, and a communication interface 14, which are disposed to the other side of the one lateral end portion of the main body 1a, respectively. The operation switch 10 allows a user to input various instructions to the reading apparatus OR. The LED 11 is operative to visually indicate information to send notice to a user. The beeper 13 is operative to emit a series of beeps to send notice to a user. The communication interface 14 allows the reading apparatus OR to communicate with external devices.

On the other hand, the optical information reading apparatus OR is provided with a battery 15 as a power supply for activating the above optical devices 5 and 7, the electrical components installed in the circuit board 9, and the above I/O devices 2, 10–14, respectively.

FIG. 3 schematically illustrates an example of the electrical structure of the optical information reading apparatus OR according to the embodiment.

Specifically, as shown in FIG. 3, in the circuit board 9, a control circuit 16 composed of at least one microcomputer {a CPU (Central Processing Unit), an internal memory unit including a ROM (Read Only Memory), a RAM (Random Access Memory) and the like, and peripherals} is provided.

The control circuit 16 operates based on power supplied from the battery 15. The control circuit 16 is communicably coupled to the trigger switch 2 and the operation switch 10 so that the commands sent from the switches 2 and 10 are inputted to the control circuit 16. The control circuit 16 is communicably coupled to the area sensor 5 and the light illuminating devices 7. Specifically, the control circuit 16 is programmed to operate to control the area sensor 5 and the light illuminating devices 7 to execute reading processes of the information code written on the target R.

The control circuit 16 is also communicably coupled to the LED 11, the beeper 13, and the liquid crystal display 12 to control them. Moreover, the control circuit 16 is communicably coupled to the communication interface 14 to communicate with external devices through the communication interface 14.

Furthermore, in the circuit board 9, an amplifier (AMP) 17, an analog to digital (A/D) converter 18, a memory 19, a specified-ratio detection circuit 20, a synchronous signal generator 21, and an address generator 22 are installed so that they are communicably coupled to the control circuit 16, respectively.

The amplifier 17 is electrically connected to the area sensor 5 and operative to amplify an image signal outputted from the area sensor 5 at a gain based on a gain control signal transmitted from the control circuit 16. The A/D converter 18 is electrically connected to the amplifier 17 and operative to convert the amplified image signal into digital image data {light intensity data (pixel data) of each pixel of the light sensitive pixel area of the areas sensor 5}.

The synchronous signal generator 21, for example, periodically generates a synchronous signal to periodically output it to the area sensor 5, the specified ratio detection circuit 20, and the address generator 22 under the control of the control circuit 16.

The address generator 22 periodically counts a number of the transmitted synchronous signals to generate address signals in response to the count result, thereby outputting the address signals to the memory 19.

That is, the image data sent from the A/D converter 18 is stored in an image memory 19*a* of the memory 19 so as to correspond to the outputted address signals. The specified-ratio detection circuit 20 is operative to detect specified patterns (bit patterns) in the image data in response to the synchronous signals based on the control of the control circuit 16 so that the control circuit 16 and the specified-ratio detection circuit 20 identify the type of the information code corresponding to the image data, thereby decoding the image data based on the identified result. That is, the specified patterns in the image data allow the control circuit 16 and the specified-ratio detection circuit 20 to identify the type of the image data (information code).

In the embodiment, as illustrated in FIG. 5A, the area sensor 5 is configured to the CCD area sensor having the light sensitive pixel area 5*a* composed of a large number of pixels P arranged in rows and columns, for example, in matrix. For example, the CCD area sensor has approximately 300,000 pixels arranged in rows and columns. FIG. 5A schematically illustrates the pixels P arranged in a grid.

The light sensitive pixel area 5*a* (pixels P) has a predetermined field of view (FOV) F whose shape is determined based on the shape of the light sensitive pixel area, such as a square (see FIG. 4A).

In the first embodiment, as illustrated in FIGS. 1, 2A and 2B, the area sensor 5 is mounted on the board 4 in the head portion of the case 1 such that the pixel area 5*a* of the area sensor 5 is opposite to the window surface of the reading window 1*c*, and row and column directions RD and CD of the pixel area 5*a* are inclined to the lateral side direction LD 1 and the longitudinal side direction LD2 of the reading window 1*c*, respectively (see FIG. 2B).

Specifically, the row and column directions RD and CD of the pixel area 5*a* are inclined at an angle of approximately 45 degrees to the lateral side direction LD 1 and the longitudinal side direction LD2 of the reading window 1*c*, respectively (see FIG. 2B).

That is, the area sensor 5 according to the embodiment is arranged in a state that the area sensor 5 is rotated about the optical axis thereof by an approximately 45 degrees from a state that the area sensor 5 has been normally arranged, which is illustrated in FIG. 5B. In other words, the area sensor 5 is arranged such that one of the diagonal lines of the pixel area 5*a* of the area sensor 5 is substantially parallel to the longitudinal direction (horizontal direction) LD2 of the reading window 1*c*.

Note that, in the embodiment, the control circuit 16 is configured to scan the pixels P in the pixel area 5*a* every horizontal scan line (row-by-row) to pick up the two-dimensional image data of the optical image on the pixel area 5*a*.

Next, operations of the optical information reading apparatus OR will be described hereinafter.

When a user wants to read the information code attached to the target R, the user makes locate the power-on state reading apparatus OR so that the reading window 1*c* is opposite to the target R and away therefrom at an arbitrary distance. In this state, the illuminating light emitted from each of the light illuminating devices 7 is irradiated through the reading window 1*c* to the target R.

In this state, the user operates the trigger switch 2 to turn it on.

When the trigger switch 2 is turned on by the user, the control circuit 16 exposes the area sensor 5 to pick up an optical image of the target R as an electrical image signal.

The image signal picked up by the area sensor 5 is amplified by the amplifier 17, and the amplified image signal is converted into the digital image data by the A/D converter 18. The image data is stored in the image memory 19*a* of the memory 19 so as to correspond to the outputted address signals. The specified-ratio detection circuit 20 is operative to detect specified patterns (bit patterns) in the image data in response to the synchronous signals based on the control of the control circuit 16 so that the control circuit 16 and the specified-ratio detection circuit 20 identify the type of the information code corresponding to the image data, thereby decoding the image data based on the identified result.

The specified-ratio detection operations will be described hereinafter. FIG. 4A illustrates a positional relationship between a barcode B, which is one of typical one-dimensional information codes, and the field of view F of the area sensor 5 of the optical information reading apparatus OR. FIG. 4B illustrates a positional relationship between a QR code C, which is one of typical two-dimensional information codes, and the field of view F of the area sensor 5 of the optical information reading apparatus OR.

As illustrated in FIG. 4B, the QR code C has a substantially square shape, and has finder patterns (cut-out symbols) C1 at its three corner portions, respectively. The QR code C also has a data area in which black and white cells are arranged in rows and columns to indicate data. Each of the finder patterns C1 is configured such that the ratio in length among the white and black portions thereof is constant; this ratio is set to, for example, "1(black): 1(white): 3(black): 1(white): 1(black)" independent of the scanning lines (directions) with respect to the QR code C. The finder patterns C1 allow the optical information reading apparatus OR to easily read the QR code C.

Specifically, when the specified ratio detection circuit 20 detects the specified ratio of "1:1:3:1:1", the control circuit 16 identifies that the type of the information code is the QR code C.

After the type of the information code has been identified, the control circuit 16 mainly executes the decode operations with respect to the QR code C. As the decoding operations with respect to the QR code C, the control circuit 16 detects a timing pattern represented in the data area C2, and obtains the center position of each of the cells. After that, the control circuit 16 identifies whether each of the cells is assigned to "white" or "black".

In the embodiment, even though the optical image of the QR code C, which is in the rotated position at 45 degrees with respect to the field of view F of the area sensor 5, is picked up by the area sensor 5, the control circuit 16 can decode the QR code C without any trouble. In this case, the number of the pixels P in the area sensor 5 substantially decides the resolution to the QR code C.

On the other hand, as illustrated in FIG. 4A, the barcode B consists of parallel bars of varied widths and spaces, such as two or four widths and spaces. One end of the barcode B is a start character B1, and the other end of the barcode B is a start character B2. The start and stop characters are used to identify the leading and trailing ends of the barcode B.

Specifically, the specified ratio detection circuit 20 is configured to detect the predetermined number, for example, five, of bars and the spaces therebetween at an arbitrary position on a target code to determine whether the ratio of the bars to the spaces is within a predetermined allowance range. That is, when determining that the ratio of the bars to the spaces is within the predetermined allowance range, the specified ratio detection circuit 20 determines that the target code is the barcode B.

Figure 6:
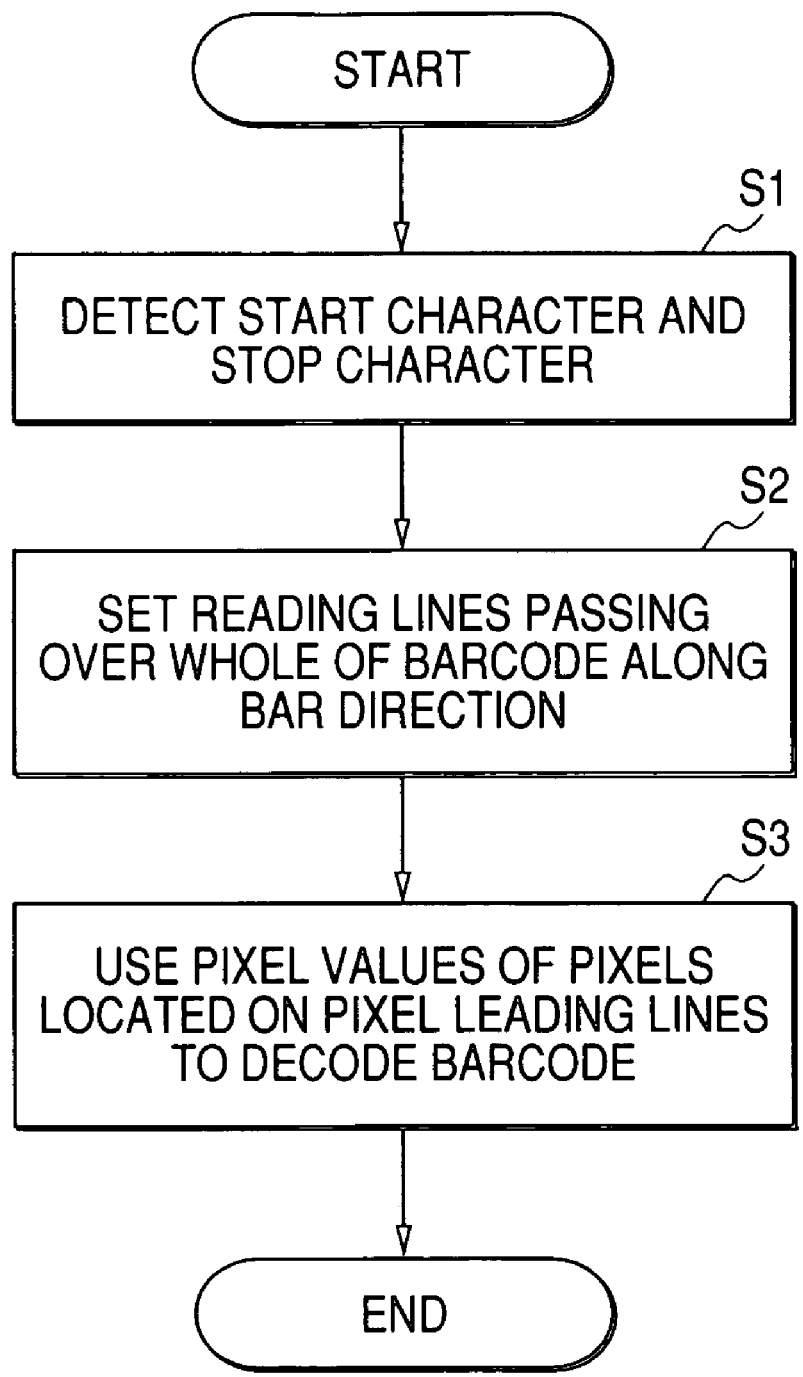
FIG. 6 is a flowchart schematically illustrating decode operations of a control circuit illustrated in FIG. 3.

The decode operations of the barcode B are carried out by, for example, the control circuit 16. Specifically, as illustrated in FIG. 6, the control circuit 16 detects the start character B1 and the stop character B2 (FIG. 6; step S1), and sets at least one reading line L passing over the whole of the barcode B along the bar direction based on the positions of the start and stop characters B1 and B2 (see FIG. 4A) in step S2.

The control circuit 16 analyses the pixel data (intensity data) of some pixels P along the at least one reading line L to decode the barcode B.

Specifically, as shown by the hatchings in FIG. 5A, which are matter of illustrative convenience, the reading lines (pixel lines) PL1 and PL2 are set to be located along one diagonal direction parallel to a horizontal direction corresponding to the longitudinal direction LD2 of the reading window 1c. The reading lines PL1 and PL2 are adjacent to each other along a vertical direction orthogonal to the line direction, corresponding to the lateral direction LD1 of the reading window 1c.

One end pixel corresponding to one end of the reading line PL2 extends from one end pixel corresponding to one end of the pixel reading line PL1 by a half pitch along the diagonal direction. Similarly, the other end pixel corresponding to the other end of the pixel reading line PL2 extends from the other end pixel corresponding to the other end of the pixel reading line PL1 by a half pitch along the diagonal direction. The half pitch corresponds to a half of the diagonal length of each of the end pixels.

Specifically, the control circuit 16 uses the pixel values of pixels P located on the pixel reading line PL1 and those of the pixels P located on the pixel reading lines PL2 to decode the barcode B in step S3.

When reading a one-dimensional code, such as the barcode B, the number of pixels along a single reading line may decide the resolution to the one-dimensional code.

In the embodiment of the present invention, however, as illustrated in FIG. 5A, the row and column directions RD and CD of the pixel area 5a of the area sensor 5 are inclined at an angle of approximately 45 degrees to the lateral side direction LD1 and the longitudinal side direction LD2 of the reading window 1c, respectively.

The arrangement allows, when the reading window 1c is opposite to the barcode B and the longitudinal direction of the reading window 1c is parallel to the bar direction thereof, the diagonal pixel region to be set to a barcode reading field of the area sensor 5.

That is, the barcode reading field (diagonal pixel region) of the area sensor 5 is wider than a barcode reading field (one row pixel line) of a normal arrangement of the area sensor 5 (see FIG. 5B).

In addition, in the embodiment of the invention, the control circuit 16 uses the pixel values of pixels P located on the pixel reading line PL1 and those of the pixels P located on the pixel reading lines PL2 to decode the barcode B. Specifically, the control circuit 16 can use the pixel values of the number of pixels of the pixel reading lines PL1 and PL2, which is approximately two time as large as the number of pixels of a single pixel line in a case of using the single pixel line as the barcode reading field.

As described above, in the embodiment of the present invention, the area sensor 5 is arranged such that the row and column directions RD and CD of the pixel area 5a are inclined at an angle of approximately 45 degrees to the lateral side direction LD1 and the longitudinal side direction LD2 of the reading window 1c, respectively.

According to the arrangement, even if the area sensor 5 has pixels that are the same as those of a conventional area sensor, it is possible to sufficiently increase the number of pixels to be used for reading an one-dimensional code, as compared with using the conventional area sensor normally arranged. This allows the resolution of the reading apparatus OR with respect to one-dimensional codes to be improved, making it possible to improve the accuracy of reading one-dimensional codes.

Particularly, in the embodiment, the control circuit 16 uses the pixel values of the number of pixels of the pixel reading lines PL1 and PL2, which is approximately two time as large as the number of pixels of a single pixel line in a case of using the single pixel line as the barcode reading field. This allows the resolution of the reading apparatus OR with respect to one-dimensional codes to be approximately two times as high as a resolution obtained by using a single pixel line as the barcode reading field.

In the present embodiment, the control circuit 16 can scan the pixels P in the pixel area 5a every scan line in a horizontal direction, which is parallel to the longitudinal direction of the reading window 1c, illustrated by the arrow A, to pick up the two-dimensional image data of the optical image on the pixel area 5a. This modification allows processing speed of the control circuit 16 when reading the image data corresponding to an one-dimensional code to increase.

In the embodiment, the row and column directions RD and CD of the pixel area 5a are inclined at an angle of approximately 45 degrees to the lateral side direction LD1 and the longitudinal side direction LD2 of the reading window 1c, respectively. The present invention is however not limited to the structure.

Specifically, the row and column directions RD and CD of the pixel area 5a are inclined at approximately any angle of 15 degrees, 30 degrees, or the like, to the lateral side direction LD1 and the longitudinal side direction LD2 of the reading window 1c, respectively.

That is, it is sufficient to incline the row and column directions RD and CD of the pixel area 5a to the lateral side direction LD1 and the longitudinal side direction LD2 of the reading window 1c, respectively.

Specifically, as illustrated in FIG. 5B, when the area sensor 5 is normally arranged such that the row and column directions RD and CD are parallel to the longitudinal and lateral directions LD2 and LD1, respectively, the lengths of respective rows of the pixel area 5a along the longitudinal direction LD2 are constant.

In contrast, in the present invention, when the row and column directions RD and CD of the pixel area 5a are inclined to the lateral side direction LD1 and the longitudinal side direction LD2 of the reading window 1c, respectively, the lengths of the respective pixel lines parallel to the longitudinal direction LD2 of the reading window 1c are changed to each other.

That is, the present invention positively uses the changes of the lengths of the respective pixel lines parallel to the longitudinal direction LD2 of the reading window 1c so that it is possible to increase the area of the barcode reading field. For example, when the pixel area of the area sensor has a substantially rectangular shape, the area sensor is arranged such that one of the diagonal lines of the pixel area is in parallel to the longitudinal direction LD2 of the reading window 1c.

In the embodiment, the present invention is applied to a gun-shaped optical information reading apparatus, but the present invention is not limited to the structure. That is, the present invention can be applied to a handheld optical information reading apparatus that allows a user to grip its thin rectangular parallelepiped main body from above, or other types of reading apparatuses. As the area sensor, other types of area sensors, such as CMOS area sensors, can be used in place of the CCD area sensor.

In the embodiment, the optical information reading apparatus OR is used for reading out the QR code as a typical example of two-dimensional codes, but optical information reading apparatuses according to the present invention can read other types of two-dimensional codes, such as a stack two-dimensional code, a data matrix code, and the like.

In the embodiment, when the user locates the optical information reading apparatus such that one of the longitudinal sides of the reading window 1c is horizontally arranged, the width and length directions of the reading window can correspond to the longitudinal and lateral directions thereof, respectively. Similarly, when the user locates the optical information reading apparatus such that one of the lateral sides of the reading window is horizontally arranged, the width and length directions of the reading window can correspond to the lateral and longitudinal directions thereof, respectively.

When the reading window 1c has a substantially square, and the user locates the optical information reading apparatus such that one of the sides of the reading window 1c is horizontally arranged, the width direction of the reading window can correspond to a direction of the one of the sides of the reading window 1c. In this case, the length direction of the reading window can correspond to a direction orthogonal to the one of the sides of the reading window 1c.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading an information code, the apparatus comprising:
  a case having one wall with a reading window through which light is transmittable, the reading window having a length and a width;
  an area sensor with a pixel area composed of pixels, the pixels being arranged in rows and columns; and
  an image system having an optical axis and configured to focus light on the pixel area of the area sensor so that an image corresponding to the information code is picked up by at least part of the pixels in the pixel area as pixel data, the light being reflected from the information code based on the irradiated light,
  wherein the area sensor is disposed in the case such that;
    the pixel area is opposite to a window surface of the reading window, and
    a center of the pixel area is coaxial with the optical axis of the imaging system; and
  row and column directions of the area sensor are inclined to directions along the length and width of the reading window, respectively, while the pixel area is orthogonal to the optical axis of the imaging system.

2. An apparatus according to claim 1, wherein the number of pixels arranged in rows and that of pixels arranged in columns coincide with each other, and the row and column directions of the area sensor are inclined to directions along the length and width of the reading window at an angle of approximately 45 degrees, respectively.

3. An apparatus according to claim 1, wherein the information code is a one-dimensional code, further comprising:
  a lighting system configured to irradiate light on the one-dimensional code; and
  a circuit configured to scan the pixels in the pixel area row-by-row.

4. An apparatus according to claim 1, wherein the information code is a one-dimensional codes, further comprising:
  a lighting system configured to irradiate light on the one-dimensional code so that the image corresponding to the one-dimensional code is picked up by at least part of the pixels in the pixel area as pixel data; and
  a circuit configured to:
  set a plurality of reading pixel lines passing over a whole of the image corresponding to the one-dimensional code and stored in the pixel area; and
  use the pixel data in the plurality of reading pixel lines to decode the one-dimensional code.

5. An apparatus according to claim 4, wherein the plurality of reading pixel lines are two pixel lines adjacent to each other along a direction orthogonal to the pixel line direction, a length of one of the pixel lines being different from that of the other of the pixel lines.

6. An apparatus according to claim 4, wherein the row and column directions of the area sensor are inclined to directions along the length and width of the reading window at an angle of approximately 45 degrees, respectively, and the plurality of reading pixel lines are arranged along one of diagonal directions of the pixel area of the area sensor.

7. An apparatus according to claim 1, wherein a plane defined by the rows and columns of the pixel area is parallel to a plane defined by the length and width of the reading window.

8. An apparatus for optically reading an information code, wherein the information code is a one-dimensional code, the apparatus comprising:
- a case having one wall in which a reading window through which light is transmittable, the reading window having a length and a width; and
- an area sensor with a pixel area composed of pixels, the pixels being arranged in rows and columns, the area sensor being disposed in the case such that the pixel area is opposite to a window surface of the reading window, and row and column directions of the area sensor are inclined to directions along the length and width of the reading window, respectively;
- a lighting system configured to irradiate light on the one-dimensional code;
- an imaging system configured to focus light on the pixel area of the area sensor so that an image corresponding to the one-dimensional code is picked up by at least part of the pixels in the pixel area as pixel data, the light being reflected from the one-dimensional code based on the irradiated light; and
- a circuit configured to:
- set a plurality of reading pixel lines passing over a whole of the image corresponding to the one-dimensional code and stored in the pixel area; and
- use the pixel data in the plurality of reading pixel lines to decode the one-dimensional code;
- wherein the plurality of reading pixel lines are two pixel lines adjacent to each other along a direction orthogonal to the pixel line direction, a length of one of the pixel lines being different from that of the other of the pixel lines.

* * * * *